United States Patent [19]
Bürgers

[11] 4,332,495
[45] Jun. 1, 1982

[54] WOODEN FRAMES OR THE LIKE HAVING TWO FRAME PARTS ADAPTED TO BE CONNECTED BY A CLAMPING-ECCENTRIC CONNECTOR

[75] Inventor: August Bürgers, Erkelenz-Gerderath, Fed. Rep. of Germany

[73] Assignee: Europatent S.A., Luxembourg, Luxembourg

[21] Appl. No.: 200,692

[22] Filed: Oct. 27, 1980

[30] Foreign Application Priority Data

Apr. 29, 1980 [DE] Fed. Rep. of Germany ... 8011691[U]

[51] Int. Cl.$^3$ ............................................. F16B 2/18
[52] U.S. Cl. ....................................... 403/6; 403/376; 403/402; 5/298
[58] Field of Search ....................... 403/401, 402, 6, 8, 403/231, 376; 5/298

[56] References Cited

FOREIGN PATENT DOCUMENTS

| | | | |
|---|---|---|---|
| 519629 | 1/1921 | France | 5/298 |
| 2313586 | 12/1976 | France | 403/231 |
| 311753 | 2/1956 | Switzerland | 403/8 |
| 337997 | 11/1930 | United Kingdom | 403/343 |
| 1174319 | 12/1969 | United Kingdom | 403/258 |

Primary Examiner—Andrew V. Kundrat
Attorney, Agent, or Firm—Martin A. Farber

[57] ABSTRACT

A wooden frame or the like having two frame parts abutting at a joint and having a tensioning-eccentric connector, the two frame parts each having a borehole which extends perpendicular to the joint and each having a preferably round recess at the end of each borehole, a round tensioning eccentric being adapted to be inserted turnably into the recess of one of the frame parts and a tension bolt being adapted to be introduced into each borehole, the clamping end of which bolt engages into the tensioning eccentric and the fastening end thereof is held fast in the recess of the other frame part by a holder. The holder comprises an abutment stop part which is fixed on the fastening end of the tension bolt, the length of which abutment stop part in the circumferential direction of the recess which receives the abutment stop part being greater than the diameter of the corresponding borehole. The stop part has a stop side which is substantially complementary to the shape of the circumferential wall of the recess, and the inner dimension of this recess in the axial direction of the boreholes corresponding approximately to the length of the tension bolt including that of the stop part, whereby the tension bolt can be introduced into the boreholes from this recess.

6 Claims, 3 Drawing Figures

WOODEN FRAMES OR THE LIKE HAVING TWO FRAME PARTS ADAPTED TO BE CONNECTED BY A CLAMPING-ECCENTRIC CONNECTOR

The present invention relates to a wooden frame or the like having two frame parts abutting at a joint and having a tensioning-eccentric connector, the two frame parts each having a borehole which extends perpendicular to the joint and each having a preferably round recess at the end of the respective borehole, a round tensioning eccentric being adapted to be inserted turnably into the recess of one of the frame parts and a tensioning bolt being adapted to be introduced into the boreholes, the clamping end of which bolt engages into the tensioning eccentric and the fastening end thereof is held fast in the recess of the other frame part by means of a holder.

Frames which are assembled from frame parts of wood or wood-like material or consist of plastic frame parts which are similarly assembled are encountered in a large number of cases, for instance as a filler and coverings for doors, window frames, picture frames and in diversified form in the furniture industry.

In particular in the case of those frames in which the frame parts which abut at the frame corners must be cut and assembled at a bevel for aesthetic reasons, the production of such miter joints is very expensive. Fastening screws leave visible connection places on outer parts of the frame which remain visible and they therefore are out of the question, for instance, for frames of unpainted wood. In the case of hidden gluings it is very difficult to hold the frame parts together until the setting of the glue in such a manner that they fit precisely and provided a joint which is as tight as possible. In order particularly to connect two frame parts, even in the case of miter connections with or without gluing, by connecting means which are not seen on the finished frame tensioning-eccentric connectors are known in which the tensioning bolt is fastened at its fastening end by threading it into one of the two frame parts, which is cumbersome and requires that the tensioning bolt be developed with a screw thread or that it be held fast by a locking pin which is hammered blind from the rear of the frame part into a transverse bore of the tensioning bolt, which is complicated and requires a high degree of skill. In another known manner, the tensioning bolt is also anchored at its fastening end by means of a second tensioning eccentric or by means of a slit insertion sleeve which can be similarly inserted into a rear recess in the frame part. These tensioning-eccentric connectors are relatively expensive since they consist of three parts and require a tensioning bolt which must be developed on both ends for cooperation with a tensioning eccentric or with the insertion sleeve. Due to the aforementioned difficulties and cost factors, the furniture and door manufactures are frequently still building frames whose frame parts are glued square since the expense of a good miter connection in which the frame parts form a clean, accurate frame corner and come together flat in the joint is too expensive.

The object of the present invention is to create a frame which, in particular, even in the case of use on mitered frame parts permits an easy and inexpensive connection which gives a precisely flush edge-aligned connection of the frame parts and requires for the clamping together of the frame parts, with or without gluing, a single tensioning eccentric connector consisting of only two parts, which can be mounted in an extremely simple manner.

This object is added in its solution in the manner that the holder comprises an abutment stop part (11) which is fixed on the fastening end (10) of the tensioning bolt (9), the length of which abutment stop part in the circumferential direction of the recess (6) which receives the abutment stop part is greater than the diameter of corresponding borehole (4), the stop part having a stop side (12) which is substantially adapted to the shape of the circumferential wall of the recess (6), and that the inside dimension (i.e. the open width) of the recess (6) in the axial direction of the borehole (4) corresponds approximately to the length of the tensioning bolt (9) including that of the stop part (11) so that tensioning bolt (9) can be introduced into the boreholes (4) from the recess (6).

This development of the frame in accordance with the invention has the following advantages:

Both frame parts can be provided at the ends of the boreholes, symmetrically relative to the joint, with an identical recess so that, in case of the preferred use with round recesses, simply only the same tool is required and it can be freely determined into which of the two frame parts the tensioning eccentric is to be inserted. The tensioning bolt can be inserted into the other frame part. This bolt need not be inserted into the boreholes before the assembling of the two frame parts but can still be inserted unimpeded and conveniently into the recess associated therewith even after the assembling of the two frame parts and can be passed through the boreholes of both frame parts until engaging into the tensioning eccentric. For connecting the two frame parts therefore it is merely necessary, with extremely little expense for assembly and labor, to insert the tension bolt into one of the two recesses and into the boreholes between the two recesses and to turn the tensioning eccentric in the other recess. In order to loosen the two frame parts again, for instance in the case of picture frames, the tensioning eccentric can be turned in the opposite direction.

In the same simple manner, two frame parts which are to be glued together can be clamped together tightly and free of gaps during the hardening of the glue. In this connection, the tensioning-eccentric connector can remain in the frame parts after the gluing, the two recesses of the frame parts being closed, for instance, by a cap placed thereon. It is also possible, in contradistinction to the known tensioning-eccentric connectors, to loosen the eccentric after the setting of the glue and both to remove the eccentric from the recess of the one frame part and to pull the tensioning bolt out of the boreholes back into the recess of the other frame part and remove it at the rear from the recess so as to be able to use the tensioning-eccentric connector again for a new, different gluing. In this way the cost of frame gluings with the use of tensioning-eccentric connectors for the clamping together of the frame parts during the setting of the glue is substantially reduced.

In accordance with another object of the invention the abutment stop part (11) is formed as a circular arc corresponding to the round shape of the recess (6) and extends over less than one-half of the circumference of the recess, and the diameter of the boreholes (4) is greater than the diameter of the tensioning bolt (9), and the clamping end (8) of the tensioning bolt, upon oblique insertion into the recess (6) can be introduced into the boreholes (4) and subsequently the stop part (11) can be placed into the recess (6).

This development is particularly suitable when the round recess of that frame part which receives the stop part (having a circular arcuate shape) of the tensioning bolt has the same diameter as the round recess of the other frame part which is adapted to the round tensioning eccentric. In this way the arc-shaped stop part fits accurately in both of the recesses. Since the circumferential length of the stop part is less than half the circumference of the recess, the tensioning bolt (with a dimensioning of the diameter of the boreholes which sufficiently exceeds the diameter of the tensioning bolt) can be inserted obliquely through the recess into the boreholes and pushed until the stop part can be swung-in and inserted into the recess, whereupon the tensioning bolt is pushed further in the recess until its stop part comes against the circumferential wall of the recess. Conversely, the tensioning bolt can be withdrawn sufficiently far so that it can then be tilted and removed obliquely entirely out of the recess. Having the diameter of the boreholes larger than the diameter of the tensioning bolt makes it possible furthermore for the two frame parts to be displaced with respect to each other and with respect to the tensioning bolt passing through the boreholes and therefore to be aligned with their surfaces exactly flush and coming together at a clean point in the corner of the frame.

The complete removability of the tensioning-eccentric connector after the setting of the glue has great advantage particularly for frames whose frame parts are wide and abut in a long joint for which a single tensioning-eccentric connector would not be sufficient for a gap-free clamping together of the frame parts, but several tensioning-eccentric connectors would be necessary.

In accordance with another feature of the invention the tensioning bolt (9) and the stop part (11) are made in one-piece of plastic having elastic properties, and the stop part, when the tensioning bolt is not clamped fast, rests via the outer ends of its stop surface (12) against the circumferential wall of the recess (6).

This development of the tensioning bolt has the advantage that the holding part can bend elastically upon the tightening of the tensioning-eccentric connector and in this way upon the clamping together of the frame parts a spring action is produced which holds the two frame parts clamped together even if the tensioning force of the tensioning bolt should give, for instance due to a yielding of the material of the frame parts at the points of contact with the tensioning-eccentric connector. The tensioning eccentric can advantageously also be made of plastic.

According to still a further feature of the invention the tensioning eccentric (7) is made of plastic, and the surfaces of the clamping end (8) of the tensioning bolt and the tensioning eccentric (7) which surfaces engage on one another are inclined with respect to the longitudinal axis of the tensioning bolt (9) in dovetail manner in an outward direction and in a direction towards the fastening end (10) of the tensioning bolt.

In this manner the development of the tensioning eccentric and of the clamping end of the tensioning bolt prevents the slot in the tensioning eccentric from opening up during strong tensile forces and prevents the clamping end of the tensioning bolt from being sheared off from the tensioning eccentric.

With the above and other objects and advantages in view, the present invention will become more clearly understood in connection with the detailed description of preferred embodiments, when considered with the accompanying drawings, of which:

Figure 1:
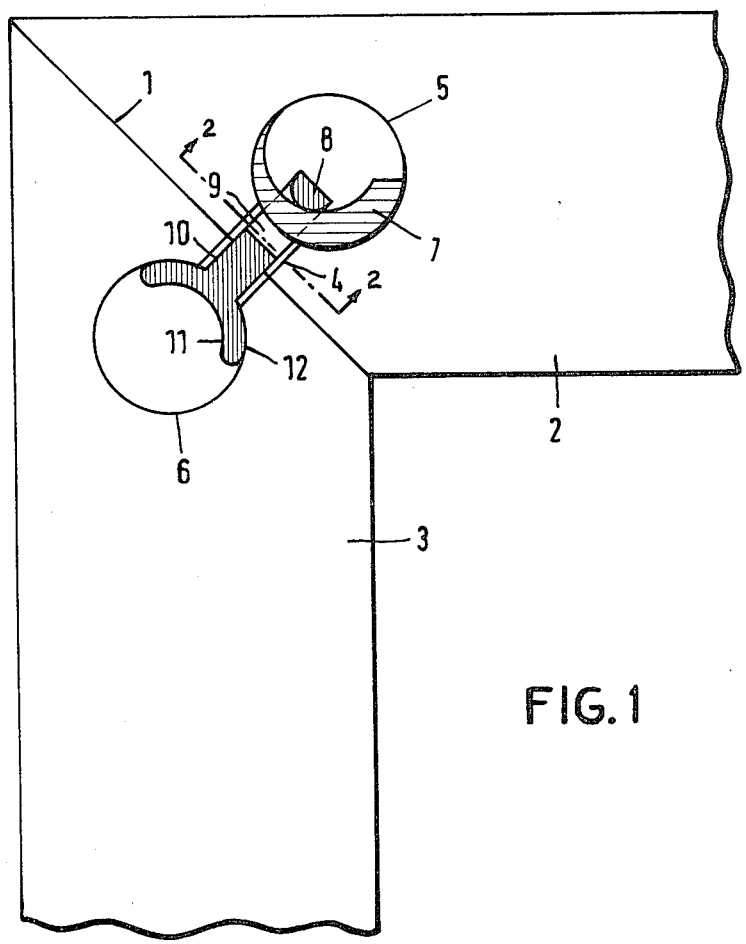
FIG. 1 is a plan view of the clamping eccentric connector connected in two frame parts at a corner.
Figure 2:
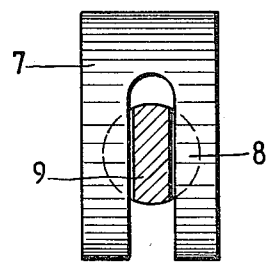
FIG. 2 is a section taken along the lines 2—2 of FIG. 1.

Referring now to the drawings, both of the frame parts 2 and 3 which abut at one corner of the frame along a joint interface 1 (also herein simply called a joint) are provided with an alignable borehole 4 which extends perpendicularly to the joint 1. Each of the frame parts are formed at the end of the borehole 4 with a round recess 5 and 6, respectively, which recesses have the same diameter. A round tensioning eccentric 7 is rotatably inserted into the recess 5. The clamping end 8 of a tension bolt 9 which passes into the recess 5 engages into the eccentric 7 which is slotted. Within the recess 6, the fastening end 10 of the tension bolt 9 is held fast by a holder which comprises an abutment stop part 11 fixed on the fastening end 10. The abutment stop part 11 is formed in the shape of a circular arc corresponding to the round shape of the recesses 5 and 6. The length of the abutment stop part 11 in the circumferential direction of the recess 6 is greater than the diameter of the borehole 4 and extends over less than one-half of the circumference of the recess 6. By suitable dimensioning of the symmetrical distance of the two recesses 5 and 6 from the joint 1 in such a manner that the inside dimension of the recess 6 in the axial direction of the boreholes 4 corresponds approximately to the length of the tensioning bolt 9 including the length of the stop part 11 and by the use of boreholes 4 whose diameter is substantially larger than the diameter of the tensioning bolt 9 a favorable result is obtained. This result is that the tensioning bolt 9 can be introduced from the recess 6 into the boreholes 4 at least in the manner that the tensioning bolt, with an initially inclined insertion into the recess 6, can have its clamping end 8 introduced so far into the boreholes 4 that the stop part 11 can be inserted in the recess 6 and then the tensioning bolt 9 can be pushed further into the tensioning eccentric 7. Conversely, the tensioning bolt 9 can first of all be pulled back so far into the recess 6 that it can then be placed at an angle and pulled entirely out of the boreholes 4 and the recess 6. Within the scope of the invention, the recess 6 can also be elongated in the axial direction of the boreholes 4 in order to be able if necessary to insert the tensioning bolt 9 into the recess without inclining it and to push it into the boreholes 4 or conversely to withdraw the tensioning bolt 9 entirely out of the boreholes 4 and then remove it rearward from the recess. The tensioning bolt 9 which, together with the stop part 11, consists advantageously of one-piece made of plastic having elastic properties and is shown in firmly clamped position in the drawing, may advantageously be formed such that the stop part 11, when the tensioning bolt is not firmly clamped, rests at first only via the outer end of its stop surface 12 against the circumferential wall of the recess 6. Upon tightening the tension bolt 9, the stop part 11 then bends elastically and in this way a favorable spring action is produced on the connection of the two frame parts by means of the clamping eccentric connector.

Figure 3:
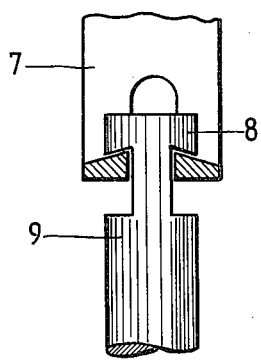
FIG. 3 is a partially broken away sectional view of another embodiment showing a dovetail engagement of the engagement surfaces of the clamping end of the tensioning bolt and the eccentric.

When the tensioning eccentric 7 is also made of plastic then, in accordance with a further development shown in FIG. 3 of the drawing, the engaging surfaces of the tensioning eccentric 7 and the clamping end 8 of the tension bolt 9 are formed such that they are inclined in dove-tailed manner outwardly with respect to the longitudinal axis of the tensioning bolt 9 and in the direction towards the fastening end 10 of the tensioning bolt. In this way the slot of the plastic tensioning eccentric 7 is prevented from spreading apart in case there are strong tensioning forces.

While there has been disclosed several embodiments of the invention, these embodiments are given by example only and not in a limiting sense.

I claim:

1. In a frame having two frame parts abutting at a joint interface and having a tensioning-eccentric connector, the two frame parts each having a borehole which extends perpendicularly to the joint interface and each having a preferably round recess at the end of its borehole, the boreholes being substantially aligned, the tensioning-eccentric connector comprising a round tensioning eccentric being adapted to be inserted turnably into one of the recesses of one of the frame parts and a tension bolt being adapted to be introduced into the boreholes, a clamping end of the tension bolt engaging into the tensioning eccentric and a fastening end of the tension bolt being held fast in the other recess of the other frame part by means of a holder, the improvement wherein the holder comprises an abutment stop part which is fixed on the fastening end of the tension bolt, said other recess receives said abutment stop part therein, the length of said abutment stop part in a circumferential direction of the other recess is greater than the diameter of the borehole in said other frame part, said abutment stop part has an abutment surface which substantially corresponds to the shape of a corresponding circumferential wall of said other recess, and said other recess has an inner dimension in an axial direction of the borehole corresponding approximately to the length of the tension bolt including that of said abutment stop part, and said tension bolt is inserted into the boreholes from said other recess.

2. The frame as set forth in claim 1, wherein
said abutment stop part is formed as a circular arc portion corresponding to a round shape of said other recess and extends over less than one-half of the circumference of said other recess, and the diameters of the boreholes are greater than the diameter of the tension bolt, and the clamping end of the tension bolt upon oblique insertion into said other recess is inserted into the boreholes and subsequently said abutment stop part is placeable into said other recess.

3. The frame as set forth in claims 1 or 2, wherein
the tension bolt and said abutment stop part comprises a one-piece plastic member having elastic properties, and said abutment surface has outer ends, said other ends rest against said circumferential wall of said other recess when the tension bolt is not clamped fast.

4. The frame as set forth in claim 1, wherein
the tensioning eccentric is made of plastic, and
the clamping end of the tension bolt and said tensioning eccentric have surfaces respectively which engage one another and are inclined with respect to a longitudinal axis of said tension bolt in dovetail manner in an outward direction and in a direction towards the fastening end of said tension bolt.

5. The frame as set forth in claim 1 or 2, wherein
each of said boreholes have the same diameter and are coaxially aligned.

6. The frame as set forth in claim 5, wherein
each of said recesses are formed circularly with an equal diameter.

* * * * *